Nov. 24, 1925.
S. BAILIE
1,563,143
VALVE FOR AUTOMOBILE HYDRAULIC BRAKES
Filed April 9, 1925
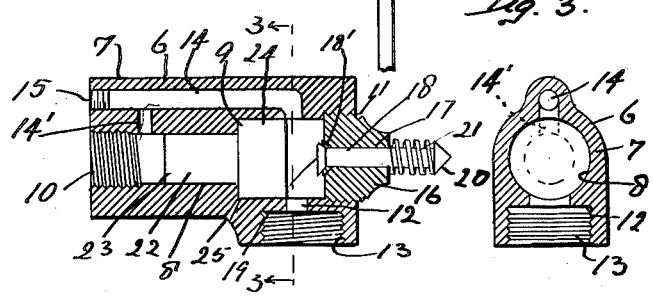
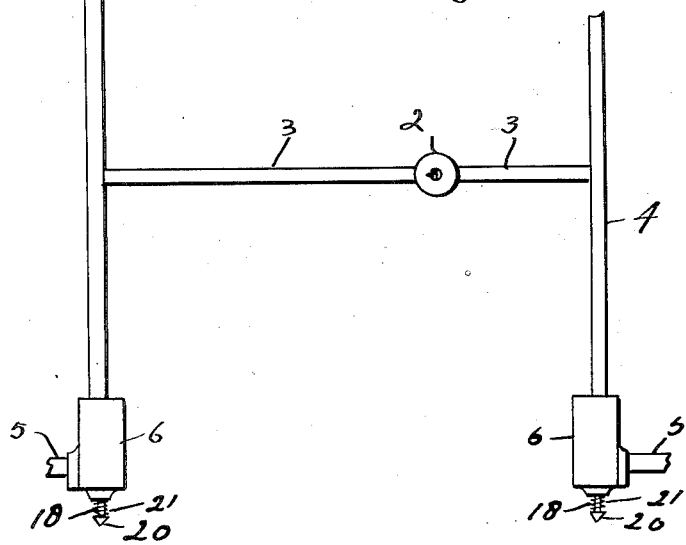
INVENTOR
Samuel Bailie
By W. W. Williamson Atty.

Patented Nov. 24, 1925.

1,563,143

UNITED STATES PATENT OFFICE.

SAMUEL BAILIE, OF CAMDEN, NEW JERSEY.

VALVE FOR AUTOMOBILE HYDRAULIC BRAKES.

Application filed April 9, 1925. Serial No. 21,807.

*To all whom it may concern:*

Be it known that I, SAMUEL BAILIE, a subject of Great Britain, residing at Camden, in the county of Camden and State of New Jersey, have invented new and useful Improvements in a Valve for Automobile Hydraulic Brakes, of which the following is a specification.

My invention relates to new and useful improvements in a valve for automobile hydraulic brakes, and more particularly to that class of hydraulic brakes wherein a displacement of a liquid in a master cylinder will cause a movement of said liquid through suitable tubes to the cylinders associated with the four wheels of an automobile for actuating the brake bands.

The primary object of this invention is to provide means to prevent accidents to automobiles and their occupants through the possible failure of the brakes to operate and such failure is possible by the breaking of the hose or connection leading to a wheel cylinder which will cause the liquid to leave the system.

Another object of this invention is to provide a valve of unique construction for connection between the main lines and the flexible connections leading to the wheel cylinders of automobile hydraulic brakes.

One of the advantages of my invention is that a valve will close should the associated branch or flexible connection break or become damaged to such an extent as to permit a quick outflowing of the liquid in the system thereby retaining sufficient of the liquid in the system to permit operation of the other brake or brakes which is impossible with present day brakes of this character for when the liquid leaks out at any point all brakes are inoperative.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawing forming a part of this application, in which:—

Fig. 1, is a diagrammatic view of a hydraulic four wheel brake system illustrating the approximate positions or locations of the valves constructed in accordance with my improvements.

Fig. 2, is an enlarged longitudinal sectional view of one of the valves.

Fig. 3, is a section at the line 3—3 of Fig. 2.

In carrying out my invention as herein embodied, 2 represents the master cylinder of a hydraulic four wheel brake system such as used on automobiles and said master cylinder 2 is connected by cross tubes or conduits 3 with the main line tubes or conduits 4 and generally the flexible conduits or hose 5 leading to the wheel cylinders (not shown) connect directly to the tube of conduits 4. When so arranged, should the connecting flexible hose or conduit 5 break or become damaged in any way to cause a leakage the system will be emptied of the fluid and none of the four brakes can be actuated.

To overcome this serious disadvantage I locate a valve 6 of unique construction between each connecting hose or conduit 5 and an associated main line tube 4. This valve includes a casing 7 having a bore 8 therethrough of two different diameters to provide a shoulder 9. Both ends of the casing are internally threaded within the bore as indicated at 10 and 11 and the threaded end 10 is the inlet which is connected with a conduit, and in practice this conduit is one of the main line tubes 4. As it is more convenient that the outlet be at an angle to the inlet and outlet opening 12 is formed in one side of the casing and communicates with the larger diameter of the bore and a threaded socket 13 with which is connected the connecting hose or conduit 5.

A passageway or by-pass 14 leads from the smaller diameter of the bore around the shoulder 9 and into the larger diameter of said bore and for convenience of manufacture one end of said passageway runs out at one end of the casing and is closed by a stopper plug 15. This necessitates the formation of a duct 14' between the passageway proper and the smaller diameter of the bore but in the finished article is to be considered as a part of said passageway or by-pass.

The threaded end 11 of the bore is closed by a plug 16 having threaded engagement with the casing and in a hole 17 in said plug is slidably mounted a resetting or push rod 18 having an enlargement 19 at its inner end to prevent accidental withdrawal and another enlargement 20 at its outer end against which rests one end of a spring 21, as the movable element, while the other end of said spring rests on the plug 16, as the stationary element, and therefore said spring will normally force or hold the push rod outward as will be obvious. To prevent leakage about the push rod 18 a washer 18' is interposed between the enlargement 19 and the inner end of the plug 16.

Within the bore of the casing is the valve plug 22 consisting of a shank 23, to fit the smaller diameter of the bore, and a head 24 to fit the larger diameter of said bore and said head is of sufficient width or thickness to cover either the outlet 12 or the end of the passageway 14 communicating with the larger diameter of the bore or both when the valve plug is moved outward or toward the plug 16.

As the valve plug or piston 22 snugly fits the casing bore I provide a vent 25 through a wall of the casing and communicating with the larger diameter of the bore to eliminate suction when the piston moves outward and prevent back pressure when the piston is moved inward by permitting ingress and egress of air, thus assuring free and easy working of said piston.

In practice the liquid in the system will fill the cross pipes 3, the main line pipes 4 and the hose 5 as well as the unoccupied portions of the casing bore 8 and passageway or by-pass 14 and when an application of the brakes is necessary the liquid will move from the inlet to each valve through the passageway or by-pass 14 into the larger portion of the casing bore beyond the head of the valve plug or piston and thence through the outlet 12 into an associated connecting hose or flexible conduit. The pressure of the liquid in the system being greater against the head 24 than against the shank 23, due to the larger diameter of said head, the valve plug or piston 22 will be normally held in its open position as shown in Fig. 2, but should the liquid be exhausted from the larger diameter of the bore or the pressure acting on the head be reduced, due to the connecting hose or conduit 5 becoming disconnected or broken, the pressure of the fluid on the end of the shank of the valve plug or piston will cause said piston to move instantly outward until the head thereof is disposed across the fluid passage and thereby preventing further loss of the fluid from the system leaving a sufficient amount of fluid for actuating the other brakes. This action is caused to a great extent because of the difference in the areas of the duct 14' and the piston shank 23.

After the damage which caused the valve to actuate has been repaired it is necessary to return the valve plug or piston to its normal open position which is accomplished by moving the resetting or push rod 18 inward against the action of the spring 21 and as soon as the pressure on said push rod is released the spring will return to its normal position.

Of course I do not wish to be limited to the exact details of construction as herein as these may be varied within the limits of the appended claims without departing from the spirit of my invention.

Having thus fully described my invention, what I claim as new and useful is:—

1. The combination with a hydraulic brake including conduits and flexible connecting hose, of valves between the conduits and hose, said valves being maintained in an open position due to unbalanced pressure at opposite ends and automatically closing when the pressure is suddenly reduced at the outer end.

2. In a fluid operated brake system, main line tubes, valve casings connected to said tubes, hose connected to the outlets of said casings, a piston in each of said casings and held in an open position due to a greater pressure of the fluid on one end than on the other and adapted to be automatically closed by the pressure on the inner end of the piston when pressure on the outer end of the piston is reduced.

3. A valve for use with fluid operated brake systems comprising a casing having a passage of different diameters therethrough, a by-pass communicating with the different diameters of said passage, and a piston having working surfaces of different areas and normally held in an open position due to pressure of fluid on the piston surface of larger area and being moved to a closed position by pressure of said fluid on the piston surface of smaller area when the pressure on the larger surface is reduced.

4. In a fluid operated brake system, a valve for connection with each connecting conduit and a main line tube, said valve comprising a casing having a passage of two different diameters therethrough and a by-pass communicating with the different diameters of said passage to convey the fluid in the system from one part of the passage to another and a piston having working surfaces at opposite ends and of different areas, the smaller surface being adjacent the inlet end of the casing and the larger surface adjacent the point of communication of the by-pass with the larger diameter of the passage and normally held in an open position due to pressure of the fluid on the larger surface and adapted to be moved to a position across an end of the by-pass by pressure of the fluid upon the smaller surface when the pressure on the larger surface has been reduced.

5. The structure set forth in claim 4 having manually operated means to reset the piston.

6. A valve for use with fluid operated four wheel automobile brake systems comprising a casing having an inlet and outlet, a piston provided at opposite ends with large and small working faces, the smaller face being associated with the inlet and said casing also having a by-pass leading to opposite ends of the piston when the latter is in an open position where it is held by pressure of the fluid in the system upon the larger face thereof, said piston being moved to the closed position across an end of the by-pass by pressure of said fluid on the smaller face of the piston when the pressure at the opposite end has been reduced.

7. The structure in claim 6 having a vent in the casing back of the larger working face of the piston.

8. A valve for use with automobile hydraulic brake systems comprising a casing having a bore of two diameters therethrough threaded at both ends and providing a shoulder, also having an outlet leading from the larger diameter of the bore and further provided with a by-pass forming a communication between the different diameters of said bore, means having threaded connection with the casing to close the larger end of the bore, and a piston of two diameters fitting within the bore and coacting with the shoulder, the different diameters producing working faces of different area whereby the piston may be held in a normally open position by pressure of a fluid passed through the by-pass upon the larger face and being moved to a closed position across the outlet and one end of the by-pass by pressure of the same fluid on the smaller face when the pressure on the larger face is reduced.

9. A valve for use with automobile hydraulic brake systems comprising a casing having a bore of two diameters therethrough threaded at both ends and providing a shoulder, also having an outlet leading from the larger diameter of the bore and further provided with a by-pass forming a communication between the different diameters of said bore, means having threaded connection with the casing to close the larger end of the bore, and a piston of two diameters fitting within the bore and coacting with the shoulder.

10. A valve for use with automobile hydraulic brake systems comprising a casing having a bore of two diameters therethrough threaded at both ends and providing a shoulder, also having an outlet leading from the larger diameter of the bore and further provided with a by-pass forming a communication between the different diameters of said bore, a piston of two diameters slidably mounted in the bore, a plug having a hole therethrough threaded into the larger end of the bore and means mounted in said hole and spring actuated in one direction whereby the piston may be manually moved in one direction.

11. A valve for use with automobile hydraulic brake systems comprising a casing having a bore of two diameters therethrough threaded at both ends and providing a shoulder, also having an outlet leading from the larger diameter of the bore and further provided with a by-pass forming a communication between the different diameters of the bore, a piston of two diameters slidably mounted in the bore, a plug having a hole therethrough threaded into the larger end of the bore, a push rod slidably mounted in the hole in said plug whereby an inward movement thereof will move the piston away from the outlet, a spring for normally holding said push rod outward, and a washer on said push rod to prevent leakage.

In testimony whereof, I have hereunto affixed my signature.

SAMUEL BAILIE.